US005475378A

United States Patent [19]

Kaarsoo et al.

[11] Patent Number: 5,475,378

[45] Date of Patent: Dec. 12, 1995

[54] ELECTRONIC ACCESS CONTROL MAIL BOX SYSTEM

[75] Inventors: Enn Kaarsoo; Bill Charlton, both of Ottawa, Canada

[73] Assignee: Canada Post Corporation, Ottawa, Canada

[21] Appl. No.: 80,616

[22] Filed: Jun. 22, 1993

[51] Int. Cl.[6] ................................ G07C 9/00; G06K 5/00

[52] U.S. Cl. ........................................ 340/825.34; 235/382

[58] Field of Search ......................... 340/825.31, 825.35, 340/825.34; 235/382.5, 382; 70/77–79; 232/25

[56] References Cited

U.S. PATENT DOCUMENTS

| | | | |
|---|---|---|---|
| 4,644,104 | 12/1987 | Middlemiss | 235/382.5 |
| 5,120,939 | 6/1992 | Claus et al. | 235/382.5 |
| 5,264,685 | 11/1993 | Eisermann | 235/382.5 |
| 5,329,250 | 8/1994 | Durkin | 340/825.35 |
| 5,345,379 | 9/1994 | Brous et al. | 340/825.34 |
| 5,392,025 | 2/1995 | Figh et al. | 70/78 |

FOREIGN PATENT DOCUMENTS

| | | |
|---|---|---|
| 1254287 | 5/1989 | Canada . |

*Primary Examiner*—Alyssa H. Bowler
*Assistant Examiner*—Mark H. Rinehart
*Attorney, Agent, or Firm*—Oliff & Berridge

[57] ABSTRACT

An electronic access control mailbox system comprises a plurality of mail box stations. Each station consists of a locker of mail box compartments each having a door with electrically controllable solenoid operated latch, a card reader, and a local controller electrically coupled to the solenoid of each compartment door. A central controller is in electrical communication with the card reader and the local controller of each mail box station. Identification data read at the card reader of each mail box station is communicated to the central controller for processing and the central controller in turn communicates a command to the local controller for controlling operation of the solenoid operated latches of each compartment door in response to the identification data road. The system offers secure electronic access to the mail boxes which are under centralized control and monitoring.

1 Claim, 2 Drawing Sheets

ELECTRONIC ACCESS CONTROL MAIL BOX SYSTEM

This invention relates to a mail box system having access thereto under electronic control, and in particular to card controlled access for a distributed mail box system.

BACKGROUND OF THE INVENTION

Delivery systems for secure distribution of printed material utilizing stations of lockable compartments are well known. A conventional delivery station comprises an array of compartments, such as mail boxes, each having a compartment door which includes a lockable latch. Access to a compartment through its respective door is restricted to persons who possess a key capable of operating the latch lock. Such mail box delivery stations are commonly found in many areas distributed throughout a typical multi-floor office building.

U.S. Pat. No. 4,698,630, entitled "Security System", issued on Oct. 6, 1987 to American Locker Group Incorporated which is hereby incorporated by reference, discloses a secure locker system wherein access to individual compartments within the locker's array of compartments is under electronic control and effected through entry of a multiple digit user code at a keyboard console. Each compartment door includes an addressing logic circuit controlling a solenoid operated locking mechanism and the logic circuits of all the compartments are connected in parallel to the console. A user access code entered at the console, which in effect represents the "key" to unlocking specific compartments, is processed and converted to a locker address value which then is considered by each logic circuit to determine if its respective compartment door should be unlocked.

This delivery system however suffers from the disadvantage of having a user recall his or her access code. Also, each locker compartment includes an addressing logic circuit which increases the cost and complexity of the overall construction of the locker, and it is necessary to manually set address identification data at each individual compartment of the locker. Furthermore, the American Locker Group Incorporated security locker is a stand alone unit and in the case where several of these lockers are in use within an office builiding, each locker must be updated separately, for example, when a new access code is to be programmed.

SUMMARY OF THE INVENTION

It is an object of the invention to provide a new and improved electronic access control mail box system.

In accordance with a first broadest aspect of the invention, there is provided an electronic access control mail box system comprising: one or more mail boxes, each of which consists of a compartment with a door having electrically controllable locking means, a card reader for reading identification data, and control means electrically coupled to the card reader and the locking means of each compartment door for controlling operation of the locking means in response to identification data read.

According to a second broad aspect of the invention, there is provided on electronic access control mail box system comprising: a plurality of mail box stations, each of which comprises an array of one or more mail box compartments each having a door with electrically controllable locking means, a card reader for reading identification data, and local control means electrically coupled to the locking means of each compartment door for controlling operation of the locking means; and central control means in electrical communication with the card reader and the local control means of each mail box station, whereby identification data road at the card reader of each mail box station is communicated to the central control means for processing and the central control means in turn communicates a command to the local control means for controlling operation of the locking means of the compartment doors in response to the identification data read.

The electronic access control mail box system is advantageous in that its configuration may be readily adapted for varying size requirements; mail box stations may be distributed over a wide area while having centralized control and monitoring of each station within the system. Persons wishing access to a mail box or boxes of a station simply pass an identification card, such as an employee badge, through a card reader at the station. Access requests or alarm events that occur at the stations are logged and may be reported to an operator at the central controller for further handling, if necessary. In the event that centralized control fails, each mail box station may be controlled locally.

BRIEF DESCRIPTION OF THE DRAWINGS

The present invention will be further understood from the following description of a preferred embodiment of the electronic access control mail box system with reference to the accompanying drawings in which.

Similar reference numerals are used in different figures to denote similar components.

DETAILED DESCRIPTION

Figure 1:
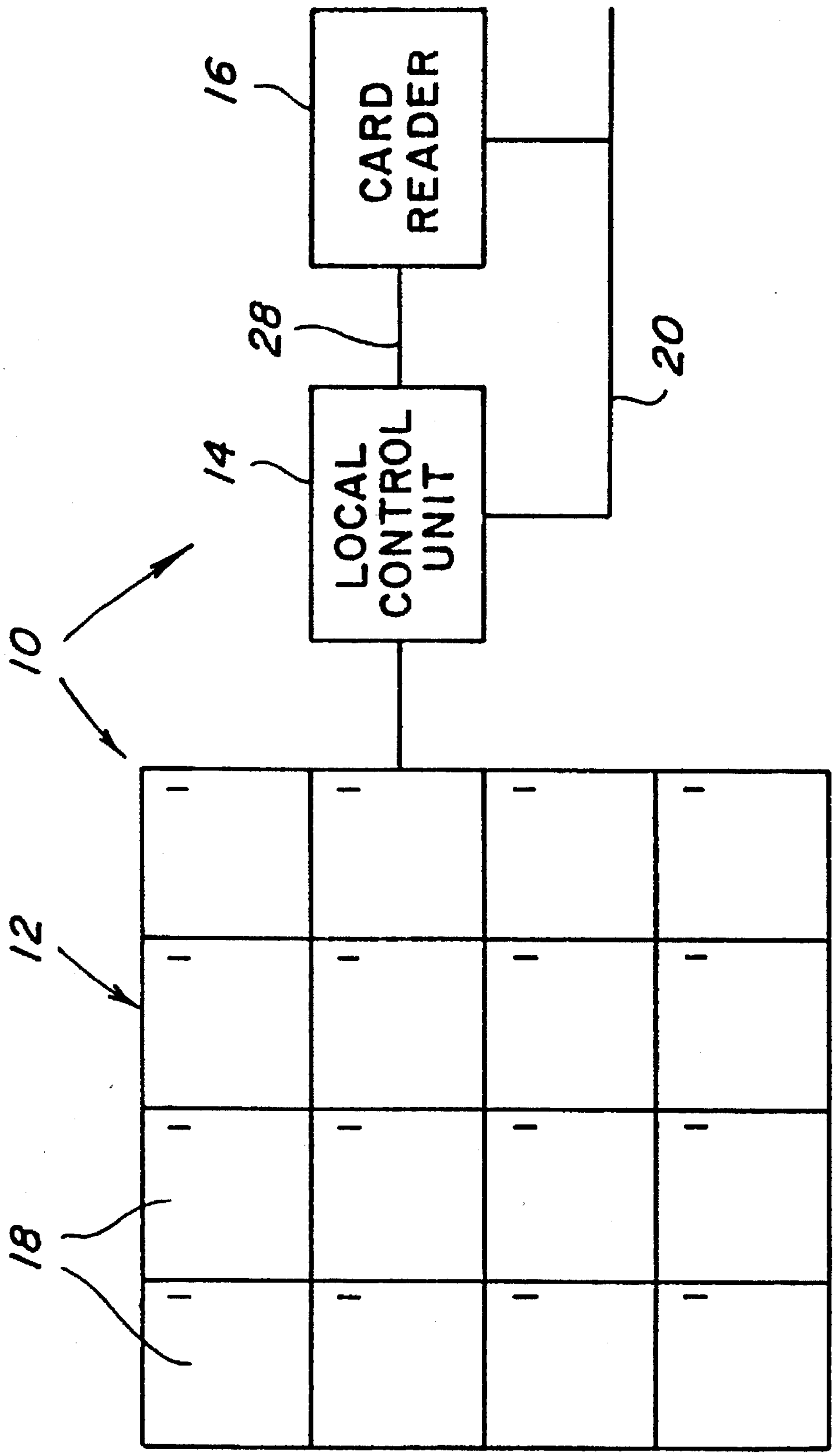
FIG. 1 is a schematic of mail box station having access thereto electronic control.

Referring to FIG. 1, illustrated is a mail box station 10 which includes electronic access control means and upon which a distributed mail box system is based the mail box station 10 consists of a mail box locker 12 electrically coupled to a local control unit 14 to which a card reader 16 is connected. The card reader 16 would normally be physically located on a wall near the mail box locker 12.

The locker 12 is a conventional arrangement formed, in this particular instance, of an array of sixteen mail box compartments 18, each having a door with an electrically operable locking mechanism such as the solenoid controlled latch described in U.S. Pat. No. 4,698,630. Application of a low voltage signal or pulse to energize the solenoid results in movement of the latch to an unlocked position, and subsequent removal of the energizing signal returns the latch to a locked position.

The control unit 14 is a microprocessor based device with its own local memory and its utilized to process both digital inputs and outputs for alarm monitoring purposes and peripheral device control purposes, respectively. One such control unit is the Matrix MS-534-16 Distributed Processing Unit marketed by Honeywell Protection Services. The digital outputs provided are for peripheral control purposes, such as camera control, lighting control or local alarm generation. The digital inputs accept various alarm signal sources (e.g. motion detectors) and are typically supervised inputs to ensure that any attempt to compromise an alarm input will be detected and logged in a manner to be described latter.

The control unit 14 includes a set of sixteen output relays, each of which is connected through separate electrical conductors to the solenoid operated locking mechanisms of each of the sixteen mail box compartments 18 at the locker 12. The relays control application of the low voltage signal needed to energize the solenoids, thereby effecting control over locking and unlocking of each mailbox compartment. The control unit 14 further contains its own integral power supply, as well as a battery back-up which may be used by the control unit 14 to supply DC power to itself and to the card reader 16, motion detectors and any other devices in the event that the AC supply should fail.

A communication bus 20 couples the control unit 14 which is local with respect to the mail box station 10 to a central control unit (shown in FIG. 2 generally denoted with 22), as will be discussed later. Over communication bus 20, the control unit 14 reports status information to the central control unit and receives commands for execution from the central control unit. Additionally, the microprocessor based control unit 14 is capable of making local decisions in the event that there is a loss of communication between the control unit 14 and the central control unit and thus the mail box station 10 can continue to operate with a loss of only a few features which are dependent on the central control unit.

The card reader 16 is also a microprocessor based unit incorporating a card slot, a keypad, a LCD display, and control inputs and outputs. The Matrix MX1 Intelligent Badge Reader marketed by Honeywell Protection Services is an example of such a card reader unit and includes thirty-two Kbytes of EEPROM memory plus a real time clock calender. The reader technology is based on the use of a magnetic stripe access card and offers a lockout feature which locks the reader so that a user cannot unlock a door until the lockout status is released. The card reader 16 is connected to the control unit 14 through bussed terminal strips 28 and to the central control unit over communication bus 20.

Figure 2:
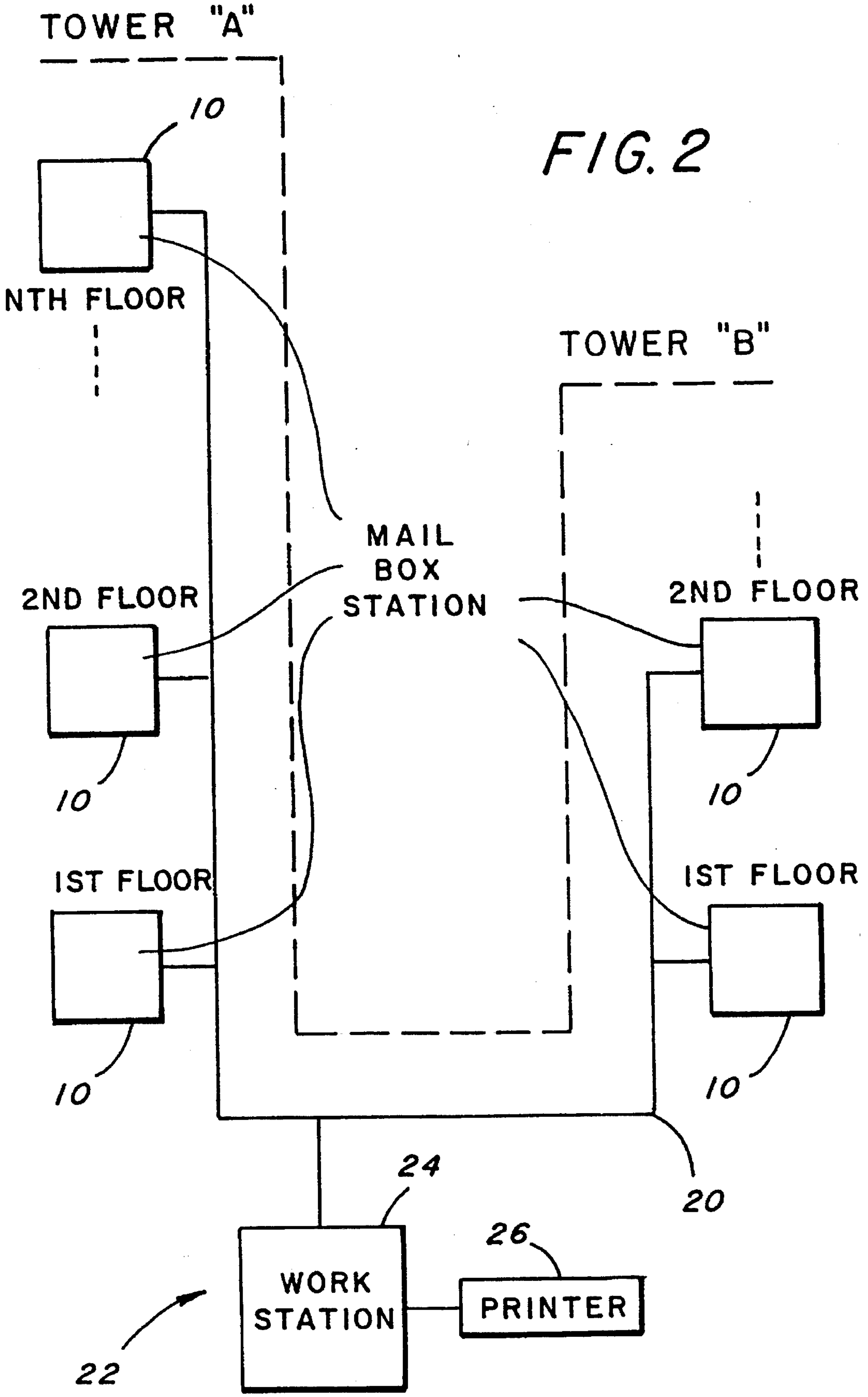
FIG. 2 is a topography of a distributed mail box system incorporating a plurality of the stations of FIG. 1.

Turning now to FIG. 2, illustrated is a topography of a distributed mail box network formed from a plurality of mail box stations 10 which are located on various floors throughout a office complex consisting of two towers and which stations communicate with a central control unit 22 over the communication bus 20.

The central control unit 22 comprises a computer workstation 24 having a processor unit, keyboard and VGA colour monitor, and a data logger printer 26. The central control unit 22 provides for the overall control and complete operation of the mail box system. The computer workstation 24 decides, in conjunction with any operator input that may be required, what actions are to be executed by the local control unit 14 and card reader 16 at each mail box station 10.

The communication bus 20 may be implemented as a RS-422 multi-drop loop configuration and combines the individual card readers 16 and control units of all stations 10 into a single unified, centrally controlled system.

The workstation 24 uses the communication bus 20 to coordinate the operation of all the card readers 16 and local control units 14, which entails such functions as the downloading of databases and the sending of commands from the central control unit 22 to the card readers 16 and the control units 14, and the receiving of reports from the card readers 16 and the control units 14. Also, the workstation 24 is capable of uploading data, such as the databases and event reports logged, to other computer processing facilities usually for analysis purposes.

The previous discussion concerned hardware utilized in the distributed mail box system (hereinafter referred to as "system"). The following is a general description of the main access control and alarm monitoring features of the system.

The system is operated from the central control unit 22 and in particular at workstation 24. The operator interacts with the system via the monitor and keyboard of the computer workstation 24, through which the operator may perform the following functions: acknowledgement of an alarm; manual granting of access; generation of report; updating of the database, e.g., access schedules, automatic schedules, card validation for the site, action plans, etc; and disabling of points, shunting of zones, etc.

The performance of the above functions is restricted to an operator with the appropriate authorization level. For instance, there may be eight predefined authorization levels and each system function requires an authorization level to perform it. Any operator with an authorization level equal to or exceeding the authorization level of the function is permitted to perform that function. Thus the authorization levels form a hierarchy with each level containing execution privileges to the functions in its level as well as to functions in all the lower levels. This approach provides for a more secure system by restricting the more security sensitive functions to the higher authorization levels.

Operator access to the system may be made more secure through the use of passwords. This access procedure provides a very high level of protection against unauthorized access to the system.

The operator has full control over the system from the workstation 24 in the central control unit 22. All devices in the system can be monitored and the complete status of the system is available at all times. Furthermore, this information is displayed in a format that permits the operator to assimilate the information quickly, and thus respond quickly.

The system features graphics and textual display. The graphic display is utilized to provide a floor plan with Icons to identify alarm points and their status. Thus the operator can immediately identify the location of an alarm. These floor plans are entered into the system and configured by the operator. The operator is provided with full control over the graphic information being displayed. The textual display can also be utilized to provide the operator with a great variety of other information e.g. action plans, access schedules, alarm point identification, etc.

The system also features an unattended mode of operation. In this mode of operation, alarms are queued to await an operator response. The system has a feature whereby it can signal an external device such as a radio pager, which can summon an operator or another authorized individual to respond to the alarm.

The operator normally handles each alarm detected and no alarms are lost by the system. The alarm generation sequence is as follows.

First a change of state occurs somewhere in the system. This change of state is detected by a card reader 16 or local control unit 14 associated with one of the mailbox stations 10, which then informs the computer workstation 24 in the central control unit 22 of the change of status via the communication bus 20. This process of detecting the change of state and transmitting it to the workstation 24 in the central control unit 22 is done very quickly, due to the high speed local microprocessors in the card readers 16 and the control units 14, the high data rate of the communication bus 20, and the utilization of a communication protocol with very low overhead. The received status change is then processed by the computer workstation 24.

The computer workstation 24 processing consists of first logging the event, (i.e. change of status), in its hard disk and to the printer 26 and then determines the appropriate action to take. This action may be to classify the change of status as an alarm and notify the operator or determining that the status change is not an alarm and requires no further action on the part of the system. The system is also capable of performing other actions in response to this status change such as the changing of the state of a digital output to control a camera or other peripheral equipment. The action that the system takes can also depend on automatic time-of-day schedules in the system.

In the event that there is a central control unit 22 failure or a communication bus 20 failure, the card readers 16 and control units 14 will store the events local to their specific station 10 and transmit them when the failure has been rectified. These events will be identified as ones which were archived by the card readers 16 and control units 14, and will receive appropriate processing by the computer workstation 24 of the central control unit 22. This feature ensures that the system can recover in an orderly manner from a failure.

In the case of multiple alarms, the system stores the alarms in a priority ranked queue, thus permitting the most urgent alarms to be processed first. There may, for example, be ten alarm priority levels in the system.

The system incorporates a high level access management system that typically allows for two hundred individual time-of-day schedules, two hundred card reader time-of-day schedules, and two hundred alarm shunt time-of day schedules, plus card reader access codes and individual user access codes. Other access control features such as local/center anti-passback (for one entry/exit zone), and central anti-passback for zones or regions with more than one entry/exit are also included in the system.

Anti-passback is accomplished with a status flag associated with each card holder. Two readers are required in order to perform anti-passback, an entry and an exit reader.

Each time a card is presented at a reader, the system checks if it is an entry or an exit. As an example, if it is an exit reader, then the system checks the status of the anti-passback flag to see if the card holder is IN or OUT. If the flag is IN, then the egress will be granted, otherwise, it will be denied. If the egress was granted, the status flag will toggle (e.g. before the transaction, the status was IN, after the transaction, the status will be OUT).

It is the same process when the card is presented at an entry reader, but the status flag would toggle in the opposite way.

In on-line mode, access control transactions are routed to the workstation 24 via the associated card reader 16 for card validation and global anti-passback checking. In the vent of a communication failure between the workstation 24 and the card reader 16, the local database of the card reader 16 provides the information that permits local decisions to be made without accessing the computer workstation 24. Local anti-passback is possible only on a Master/Slave card reader 16 configuration basis.

Another feature is the Personal Identification Number (PIN). The PIN number is used to verify that it is the card owner who is making the access request. All requests for access are processed by the computer workstation 24 in the central control unit 22. This ensures that the system is able to provide a very tight central control over the entire system. Local decisions by the card reader 16 to grant access are only made in the case of the central control unit 22 or communication bus 20 failure. In the event of such a failure, the card reader 16 utilizes its local database to make the decision as to whether or not to grant access.

Once a user has entered the access card to a card reader 16 and has entered his or her PIN, it should take less than one second to inform the user of acceptance or rejection of the request for access. To exit a secure zone, the user is required to use their card if the zone is one with the anti-passback feature.

Event logging in the system has been implemented to ensure the correct logging of all events in the system. Events are logged to the printer and the hard disk of the central control unit 22. Event logging provides a complete record of what has occurred in the system.

Operator actions are also logged by the system, thus ensuring that all proper actions have been taken in the handling of alarms.

The system is capable of providing a variety of reports that cover the complete operation of the system and facilitate the efficient management of the system. The following reports may be generated: an alarm report to indicate points currently in alarm; a trouble report to list all digital points currently in hardware error; an event report to show the status of points at a certain data and time; a roster report to show all the card holders who have access privileges at a particular card reader; and an event report to provide a history of the acceptance and rejection of cards at an card reader.

The system maintains both a host database in the central control unit 22 and a local database in each of the mail box stations 10.

The database on the computer workstation 24 of the central control unit 22 is the master or host database for the system and is utilized for processing access requests while the system is in on-line operation. All the data in the local databases of the card readers 16 and control units 14 are verified against this master database. This centralization of the database ensures that the system will operate consistently. The system automatically ensures that all databases in the system are consistently under operator control. Any modification to the central database is automatically made under operator control to the concerned local databases of the card readers 16 and the control units 14.

Through the interface provided by the workstation 24, the databases are easily adaptable to changing requirements. All editing and updating of the databases can be done while the system is on-line without the loss of any of the alarms.

A local database is used by the card readers 16 and control units 14 in each mail box station 10 in the event that it is not possible to communicate with the computer workstation 24 of the central control unit 22, specifically referred to as off-line operation. This database provides the information that permits local decisions to be made. This capability allows the system to continue to operate without any access to the host's database.

Each local database is maintained by the system under operator control by a download procedure initiated at the workstation 24.

In use, a person wishing access to a particular box or boxes of a mail box station 10 would pass his or her magnetic striped card, such as an employee identification badge, at the card reader 16 of that station 10. Identification data encoded in a magnetic stripe on the employee badge is read by the card reader 16 and then either processed locally at the mail box station 10 or centrally by the computer workstation 24 depending on whether the system is in off-line or on-line operation, respectively. Processing involves verifying the identification data and the time of day the access request is made against access code and time schedule information stored in the local or central databases. For higher security zones, the card holder making the request is required to enter his or her PIN number to verify that it is the card owner who is making the access request. On confirming that access should be granted, the card reader 16 or workstation 24 enables all valid mail box doors to be opened on the mail box locker 12 by issuing a command to the control unit 14 which will operate the appropriate relays to supply a low voltage signal to the solenoids of the valid mail boxes, thereby unlocking the doors.

All access requests made at an card reader 16 will be logged on the hard disk and the printer as regular access transactions. Reports may then be generated from the recorded data.

In a variant of the mail box system, contact switches may be incorporated between the door and compartment of each mail box in a locker in order to monitor the status of each door. The contact switches would be coupled to the alarm inputs of the control unit. Any attempt to manually pry open a mail box door or through inadvertence a door being left open will be detected and logged as an event by the system to be handled by an operator. Furthermore, the mail box system may be connected as a sub-system to a host computer, such as the security system of an office complex, which would provide two units for controlling and monitoring the mail box system.

The foregoing description has been limited to specific embodiments of the invention. It will be apparent, however, that variations and modifications may be made to the invention, with the attainment of some or all of the advantages of the invention. Therefore, it is the purpose of the appended claims to cover all such variations and modifications as come within the true spirit and scope of the invention.

The embodiments of the invention in which an exclusive property or privilege is claimed are defined as follows:

1. An electronic access control mail box system comprising a plurality of mail box stations, each said station including:

an array of mail box compartments each having a door provided with electrically controllable locking means, a card reader adapted to read identification data from an identification card, a plurality of electrical switch means connected respectively to each locking means for causing unlocking of the locking means, and a local control unit having a data base containing valid identification data, an input electrically connected to the card reader and a plurality of parallel outputs respectively connected to the switch means, the local control unit receiving identification data from the card reader;

and a remote central control unit in electrical communication with the card readers and local control units of all the mail box stations, the remote central control unit having a central data base containing valid identification data for all the mail box stations and having means for monitoring operations at the mail box stations and updating all the data bases including the central data base, whereby, in on-line operation, identification data received from a card reader is compared with data in the central data base to determine a mail box compartment of the array for which access is valid for the received identification data to generate a command that is communicated from the central control unit to the local control unit associated with the card reader to thereby energize an associate switch means and unlock an associated locking means, and whereby, in off-line operation, identification data received from a card reader is compared with data in the data base of the associated local control unit to determine a mail box compartment of the array for which access is valid for the received identification data to thereby energize an associated switch means and unlock an associated locking means.

* * * * *